Sept. 4, 1928.

E. B. SNYDER 1,683,109

CONDUCTOR SUPPORT

Filed March 7, 1924

Inventor

EDWARD B. SNYDER

WITNESS

G. G. Allenbaugh

By

Attorney

Patented Sept. 4, 1928.

1,683,109

UNITED STATES PATENT OFFICE.

EDWARD B. SNYDER, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed March 7, 1924. Serial No. 697,669.

My invention relates to a support for electric conductors and has particular reference to the supporting of conductors at points where it is desired to dead-end the same.

The object of my invention is to provide means for dead-ending a conductor in insulated relation to a support and having incorporated therein means whereby the dead-ended line will drop in case of the insulating portion breaking.

My invention resides in the new and novel construction, combination and relation of the various parts hereinafter more fully described and set forth in the specifications and in the drawings accompanying the specification.

In the drawing accompanying the specification:

Figure 1:
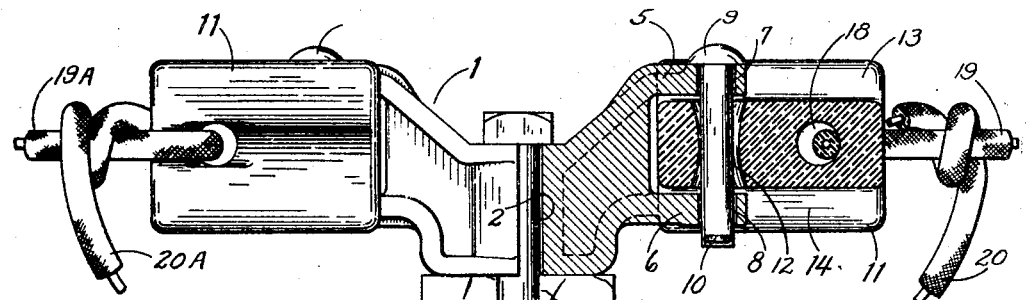
Fig. 1 shows a side view in elevation in partial section with two cables dead-ended thereto and the device secured to a cross-arm.
Figure 2:
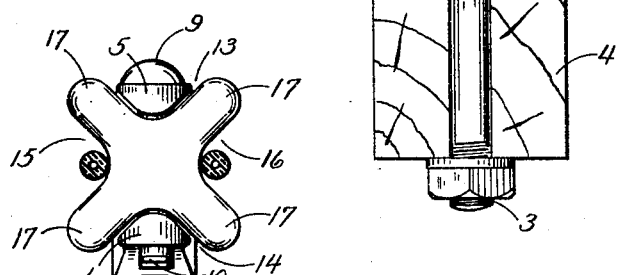
Fig. 2 shows an end view of Fig. 1.
Figure 2:
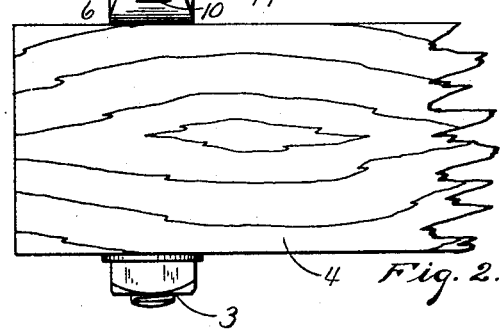
Figure 3:
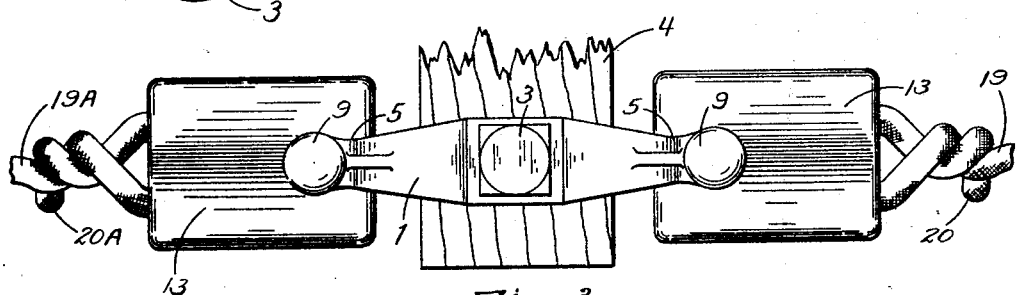
Fig. 3 shows a top plan view of Fig. 1.

In the preferred embodiment of my invention I employ a body member 1 provided with a passage 2 therethrough to receive a fastening bolt 3 by means of which the member 1 may be secured to a support such as a cross-arm 4. The body member 1 is provided with projecting members 5 and 6 forming a clevis connection, each provided with oppositely disposed passages 7 and 8, respectively, to receive a holding stud 9 which is held against displacement by a spring cotter 10, or which may be replaced by a nut threaded to the member 9 or other equivalent means.

Secured to the body member 1 and projecting in opposite directions therefrom are two insulating members 11, each provided with a passage 12 to receive the holding stud 9. The insulating member 11 is also provided with oppositely disposed longitudinal channels 13 and 14 in which are disposed the projecting members 5 and 6, respectively. The insulating member 11 is also provided with oppositely and longitudinally disposed channels 15 and 16 positioned at 90 degrees with respect to the channels 13 and 14 and separated by the insulating wings 17. The channels 15 and 16 are connected by a passage 18 to receive the cables 19 and 19ᴬ which may be either insulated or bare and are dead-ended to the insulating members. The axis of the passage 12, terminating in the channels 13 and 14, is at right angles to the axis of the passage 18, terminating in the channels 15 and 16 and are disposed at opposite ends of the insulating member.

It will be noted that the insulating members are so secured to the body member 1 that the cables 19 and 19ᴬ are not interlinked with the fastening member 9, and it will be apparent from this that if the insulator should break transversely at any point between the passages 12 and 18, that the cable 19 or 19ᴬ will be dropped. In other words, the insulating member is under tension and in compression as would be the case if the members 19 and 19ᴬ were interlinked with the member 9.

There are devices on the market for the same purpose as my invention, comprising two insulators spaced apart and mounted upon pins which are connected through a common casting or through the supporting members, the insulator being of the well known type of insulator which screws upon the pin and provided with a groove therearound to receive the cable. In this construction, the insulating member is placed under compression as it is positioned surrounding the pin and between the cable and the pin, and if the insulating member becomes injured, there may be a leakage from the cable through the insulator to the pin and then to ground, or even to the oppositely dead-ended conductor if its insulator is also injured. Such injury to the insulators may render the apparatus connected to the cables, inoperative, but on account of the construction of the support it is only with a great deal of time and expense that the defect is found, as the insulator of the type described is usually held in position upon the pin by the cable connected thereto. As already explained, with my improved construction an injury to the insulator is vary likely to permit the line connected thereto to drop and the line is sure to drop if the injury takes place between the passages 12 and 18. With the line dropped, it will be apparent at once to an inspector, seeking the trouble, when he arrives at the defective support.

My invention is found of particular value in connection with constructing lines for operating railway signal devices where it is important to note defective insulators as quickly as possible. Under such conditions the circuit is dead-ended on each side of the device, and the end leads 20 and 20^A are run to the signaling apparatus. In case of a break, the line 19 or 19^A is dropped either entirely or partially to the ground and, as stated before, is easily visible to an inspector.

My invention maintains the conductor in dead-ended insulated alinement and ready to drop if the insulating member is broken through or between the passages 12 and 18 and offers great insulation between the conductor and the ground on account of the long path therebetween and the longitudinally disposed ribs 17 offering a long surface leakage path therebetween.

My invention also lends itself to a construction, as will be apparent, where only one insulating member is used as for dead-ending the line without its continuing.

Having described my invention, I claim:

1. A combination comprising a body member, an insulating member, means on the body member to receive the insulating member, means to secure the insulating member to the body member, the insulating member provided with two pair of oppositely disposed longitudinal grooves, all grooves being parallel and each pair defined by flanges disposed at 90 degrees to the other pair, the insulating member provided with a transverse opening therethrough connecting the grooves of one pair and located adjacent the end of the insulating member to receive the connecting means on the body member, the insulating member provided with another transverse opening therethrough connecting the other pair of grooves adjacent the opposite end of the insulating member to receive a conductor and place the insulating member in tension when in action, a conductor passing through the last transverse opening and secured to the insulator and having its end free for connection and the body member provided with an opening therethrough and having its axis parallel to one of the aforesaid openings in the insulator to receive a pin to secure the body to a support.

2. An insulator comprising in combination, a body member, an insulating member provided with oppositely disposed parallel and longitudinal grooves, the insulator provided with a transverse passage therethrough connecting the grooves adjacent one end, means on the body member to coact with the grooves, means coacting with the last said means and extending through the passage at the end of the insulating member to secure the insulator to the body member with the opposite end of the insulating member projecting away from the body member, the insulator member provided with another transverse passage therethrough adjacent the opposite end of the insulator to receive a conductor and place the insulating member in tension when in use, a conductor secured to the projecting end of the insulator and placing the insulator in tension and the body member provided with an opening therethrough to receive a bolt for securing the body member to a support.

3. The combination of a body member, an elongated insulating member provided with a transverse passage adjacent one end, means on the body member to secure the insulating member to the body member, means extending through the said passage to secure the insulator to the last said means, the insulator provided with another transverse passage therethrough and at the opposite end of the insulating member, a conductor looped through the last transverse passage and secured to the insulator against slippage and placing the insulating member in tension, longitudinally disposed raised means positioned between the passages to increase surface leakage therebetween, the body member provided with a passage therethrough to receive a bolt in alinement with one of the transverse openings in the insulating member.

In testimony whereof I affix my signature.

EDWARD B. SNYDER.